United States Patent
Eto

(10) Patent No.: US 8,291,219 B2
(45) Date of Patent: *Oct. 16, 2012

(54) SYSTEM AND METHOD FOR ENABLING DEVICE DEPENDENT RIGHTS PROTECTION

(76) Inventor: Seiji Eto, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/041,643

(22) Filed: Mar. 7, 2011

(65) Prior Publication Data

US 2011/0161669 A1    Jun. 30, 2011

Related U.S. Application Data

(63) Continuation of application No. 10/899,081, filed on Jul. 27, 2004, now Pat. No. 7,908,477.

(51) Int. Cl.
*H04L 29/06* (2006.01)
(52) U.S. Cl. ............... 713/165; 726/5; 726/27; 707/781
(58) Field of Classification Search .................... 705/56; 726/2–5, 26–30; 707/781; 713/165, 182
See application file for complete search history.

(56) References Cited

U.S. PATENT DOCUMENTS

| | | | |
|---|---|---|---|
| 5,933,497 A | 8/1999 | Beetcher et al. | |
| 6,263,313 B1 | 7/2001 | Milsted et al. | |
| 6,345,256 B1 | 2/2002 | Milsted et al. | |
| 6,367,019 B1 | 4/2002 | Ansell et al. | |
| 6,389,403 B1 | 5/2002 | Dorak | |
| 6,397,333 B1 | 5/2002 | Sohne et al. | |
| 6,442,626 B1 | 8/2002 | Smola et al. | |
| 6,697,944 B1 | 2/2004 | Jones et al. | |
| 6,732,106 B2 | 5/2004 | Okamoto et al. | |
| 7,493,289 B2 | 2/2009 | Verosub et al. | |
| 2001/0051930 A1 | 12/2001 | Nakamura | |
| 2001/0051996 A1 | 12/2001 | Cooper et al. | |
| 2002/0076050 A1 | 6/2002 | Chen et al. | |
| 2002/0091643 A1 | 7/2002 | Okamoto et al. | |
| 2002/0112172 A1 | 8/2002 | Simmons | |
| 2002/0161596 A1 | 10/2002 | Johnson et al. | |
| 2003/0018791 A1 | 1/2003 | Feng | |
| 2003/0198351 A1* | 10/2003 | Foster et al. | 380/281 |
| 2003/0221113 A1 | 11/2003 | Kupka et al. | |
| 2006/0173787 A1 | 8/2006 | Weber et al. | |

FOREIGN PATENT DOCUMENTS

| | | |
|---|---|---|
| EP | 0 930 556 A2 | 7/1999 |
| GB | 2385757 A | 8/2003 |
| WO | WO 03/027864 A1 | 4/2003 |
| WO | WO 03/034733 A1 | 4/2003 |

OTHER PUBLICATIONS

WinSim Inc. (www.winsim.com/diskid32/diskid32.html), Jun. 2000.
Morello axsStrongBox Component (www.morello.co.uk/strongbox.htn), 2004.
Supplementary European Search Report, Jan. 2010.
International Search Report and Written Opinion by the International Searching Authority, Sep. 2006.

* cited by examiner

*Primary Examiner* — Hadi Armouche
(74) *Attorney, Agent, or Firm* — Duane S. Kobayashi

(57) ABSTRACT

A system and method for enhancing the protection of digital properties while also increasing the flexibility of distribution of the digital properties. In one embodiment, the digital property is protected through the binding of at least one unique client device identifier with the digital property prior to distribution. Decryption at a client device would therefore be dependent on a comparison of the unique client device identifier that is extracted from the encrypted digital property with a unique client device identifier of the device that is seeking to access the digital property.

20 Claims, 4 Drawing Sheets

SYSTEM AND METHOD FOR ENABLING DEVICE DEPENDENT RIGHTS PROTECTION

This application is a continuation of non-provisional patent application Ser. No. 10/899,081 (Now U.S. Pat. No. 7,908,477), filed Jul. 27, 2004, which is incorporated by reference herein, in its entirety, for all purposes.

BACKGROUND

1. Field of the Invention

The present invention relates generally to prevention of unauthorized access to electronic data by restricting the ability to access desired content. In particular, the invention provides a system and method whereby electronic content can be securely transmitted over a network by binding the content to unique identifiers associated with a plurality of client-owned devices, and restricting access to the content to only those devices.

2. Introduction

In recent years there has been an exponential growth of the Internet, coupled with advances in technology resulting in software programs, music, books, video games, even full-length movies, becoming available in high-quality, easily reproducible and easily transmitted digital formats. This has resulted in both unparalleled marketing opportunities and major challenges for manufacturers and distributors of these digital properties. The same factors that make these digital properties attractive to market, purchase and distribute also make them easy prey for pirates to steal and either sell or give away, resulting in huge losses in revenue for developers and distributors of these digital properties.

This dilemma has resulted in a series of defensive maneuvers to thwart the pirates, who have just as aggressively sought ways to continue doing what they do. None of the efforts so far have been completely successful in protecting the rights of intellectual property owners. There still remains a need for a simple and secure method for developers and distributors of electronically-based material to be able to market and distribute their products over the Internet and other networks in a manner that enables them to take advantage of the huge potential these distribution media offer and to provide easy access to authorized buyers, while still protecting their intellectual property from illegal access and distribution.

SUMMARY

In accordance with the present invention, a system and method are provided for enhancing the protection of digital properties while also increasing the flexibility of distribution of the digital properties. In one embodiment, the digital property is protected through the binding of at least one unique client device identifier with the digital property prior to distribution. Decryption at a client device would therefore be dependent on a comparison of the unique client device identifier that is extracted from the encrypted digital property with a unique client device identifier of the device that is seeking to access the digital property.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Addressing the critical need of safely transmitting valuable intellectual property over networks, including the Internet, should also consider the ease of granting access to the digital property by authorized purchasers who often possess a plurality of playback devices. It is a feature of the present invention that a client seeking to play desired content on a plurality of devices can be easily granted authorization to do so, while also preventing unauthorized access by anyone not in possession of one of the specific set of client devices.

Figure 1:
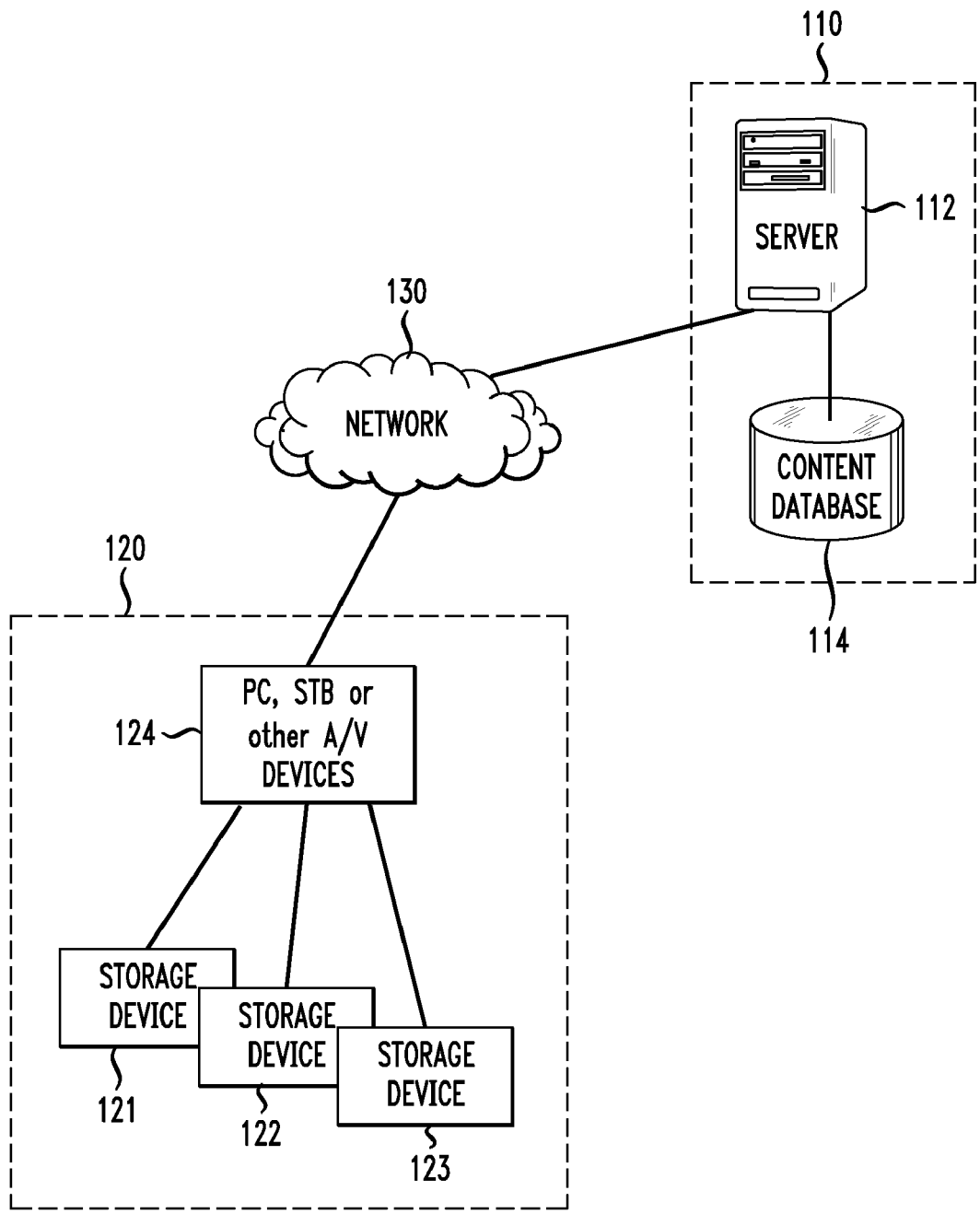
FIG. 1 Illustrates a computer network environment that includes a client who desires content, a content provider and a network through which they can communicate.

FIG. 1 illustrates an embodiment of the present invention, with a client 120 communicating with a content provider 110 through a network 130. In various embodiments, the network can include a wide area network (WAN) such as the Internet, a local area network (LAN) or a combination of the two. Client 120 is generally operative to communicate with content provider 110 to identify and obtain digital properties.

In the illustrated embodiment, content provider 110 includes a server 112 used to receive and transmit data with clients 120, and a storage device 114 containing a database used to store content available to be purchased and downloaded by clients 120. As illustrated, client 120 includes at least one client parent device 124, and a plurality of client child devices 121, 122, 123. In one embodiment, client parent device 124 represents a processing device such as a personal computer (PC), set top box (STB), or other audio/video device (e.g., mobile phone, personal digital assistant) that can communicate with server 112, while client child devices can represent a storage device or other device that can receive data that is retrieved by client parent device 124. Each client device 121, 122, 123, 124 can include one or more unique device identifiers that can be retrieved electronically and which precisely identify the device.

As noted, the client 120 may include one or more of a class of devices such as a PC, STB, other audio/video devices (or any network-ready device), a storage device, a portable music/video player, a personal digital assistant, a portable phone, or any of a number of devices capable of accessing electronic files. Furthermore, a plurality of client storage devices 121, 122, 123 that are usable by client parent device 124 may include a hard disk drive, a removable disk (such as a compact disk (CD)), digital versatile disk (DVD), floppy disk, ZIP disk, flash cards) or other media, each of which also possesses one or more unique identifiers that are retrievable by electronic means and which are ideally non-erasable and non-changeable. In one example, a unique identifier associated with each one of a plurality of storage devices comprises one or more of the following: product ID number, serial number or product revision number.

Referring again to FIG. 1, the content provider 112 includes a server 112 and at least one content database 114. In one embodiment, the server 112 is a Sun J2EE Web Server. However, any server that can operate in a web environment could be used. Since the content transmitted to client 120 is to be protected, all content transmitted over the network 130 is encrypted. In one embodiment, encryption is performed before the content is stored in the content database 112, thereby reducing the processing time during client transactions. In an alternative embodiment, encryption of the content is performed during a transaction when the content is being requested by client 120.

In the environment of FIG. 1, various solutions have sought to identify mechanisms by which digital content can be transmitted to a client device for playback or use only on that client device. This limitation is a natural consequence of the desire to limit the distribution of the digital content by the various clients. In accordance with the present invention, protected content can be transmitted to a client for use by a plurality of client devices. In this process, a plurality of unique client device identifiers are bound to the digital content. In one embodiment, a device identifier table is used to store the unique device identifiers associated with a respective plurality of client devices 121, 122, 123, 124. This feature of the present invention is highly desirable, since most clients seeking content now possess multiple devices suitable for playback of digital content. This and other features of the present invention are described in greater detail in the context of FIG. 2.

Figure 2:
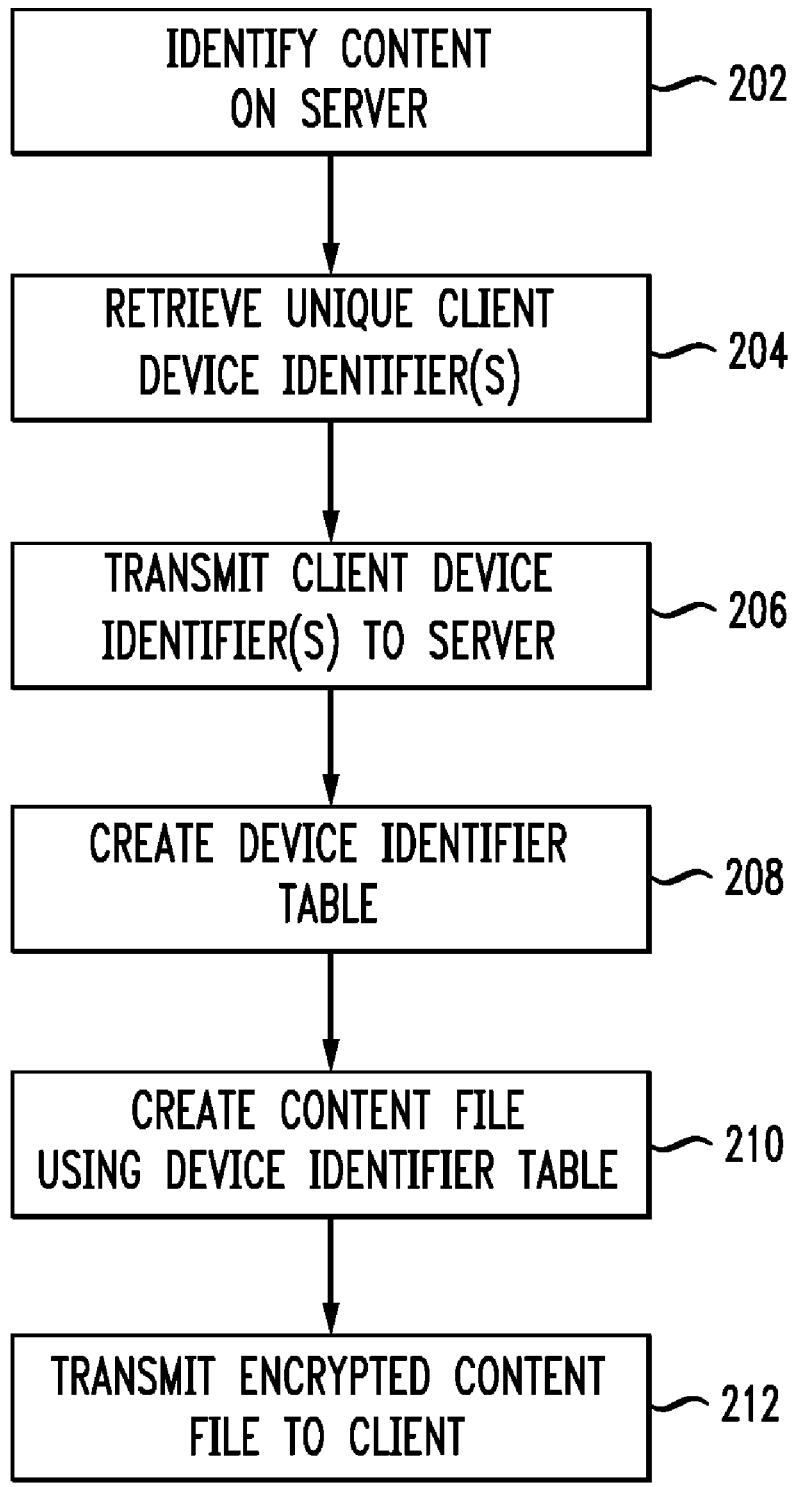
FIG. 2 is a flow chart of a process whereby unique client device identifiers are retrieved and used to create a device identifier table at a server.

FIG. 2 is a flowchart showing the process in an embodiment of the invention wherein a client identifies and requests desired content, and then receives it in encrypted form. The process begins, at step 202, with a client 120 identifying desired content located in a content database 114 at the server 112 of a content provider 110. At step 204, one or more unique client device identifiers associated with a respective plurality of client devices 121, 122, 123, 124 are retrieved. For example, in one scenario the unique identifier for a PC hard disk drive could include the product ID number and the serial number for the hard drive (or possibly even the PC itself). In another example, the unique identifier for a portable music player could include the serial number of the player and a product revision number. Next, at step 206, the retrieved unique client device identifiers are encrypted and transmitted over the network 130 from client 120 to the server 112 of the content provider 110.

It is a feature of the present invention that the content provider 110 can bind a plurality of device identifiers with a single piece of protected content to thereby enable a plurality of devices to access the protected content. In one embodiment, this feature of the present invention is enabled through the creation of a device identifier table at step 208. In this process, the plurality of device identifiers received from client 120 are stored in memory for later retrieval during the content file creation process. These device identifiers give the content provider 110 information by which he can accurately identify a plurality of devices and/or storage media which the client 120 would utilize in seeking access to the desired content. At step 210, the desired content is bound to this device identifier table to create a content file that includes information suitable for restricting access to desired content to only those devices represented in the device identifier table.

In one embodiment, the desired content can also be bound to a timestamp (in addition or in place of the device identifier table) that is used to limit the time duration during which the content can be accessed by client device(s). For example, a timestamp can be bound to the content that specifies that a particular movie file can be viewed for a three or five day time period in a similar manner to a conventional movie rental. In this embodiment, access to the content can be conditioned on a comparison of a current time to the timestamp. In one embodiment, the current time is retrieved from a network source to thereby prevent tampering with the time readings at a local device.

The file created in step 210, which includes pre-encrypted content combined with the device identifier table, is then transmitted to the client 120 at step 212 where a determination is made to grant or deny access to the desired content. In one example, all content that is to be made available to be purchased and downloaded is pre-encoded and stored in a content database 114. In one embodiment, the retrieved device identifiers, which are received in encrypted form from the client, can be bound to the pre-encrypted content in step 210 in a way that could facilitate processing time. For example, the encryption key that is used to encrypt the device identifier table can also be used to encrypt the key that was used to pre-encrypt the content. In this manner, access to the device identifier table and the content can be obtained using a single encryption key. In another example, security is improved by using two different encryption keys to encrypt the device identifier table and the content. In an alternate embodiment, content is stored in unencrypted form. Here, the content and the device identifier table would both be encrypted when the content is requested by the client 120.

Figure 3:
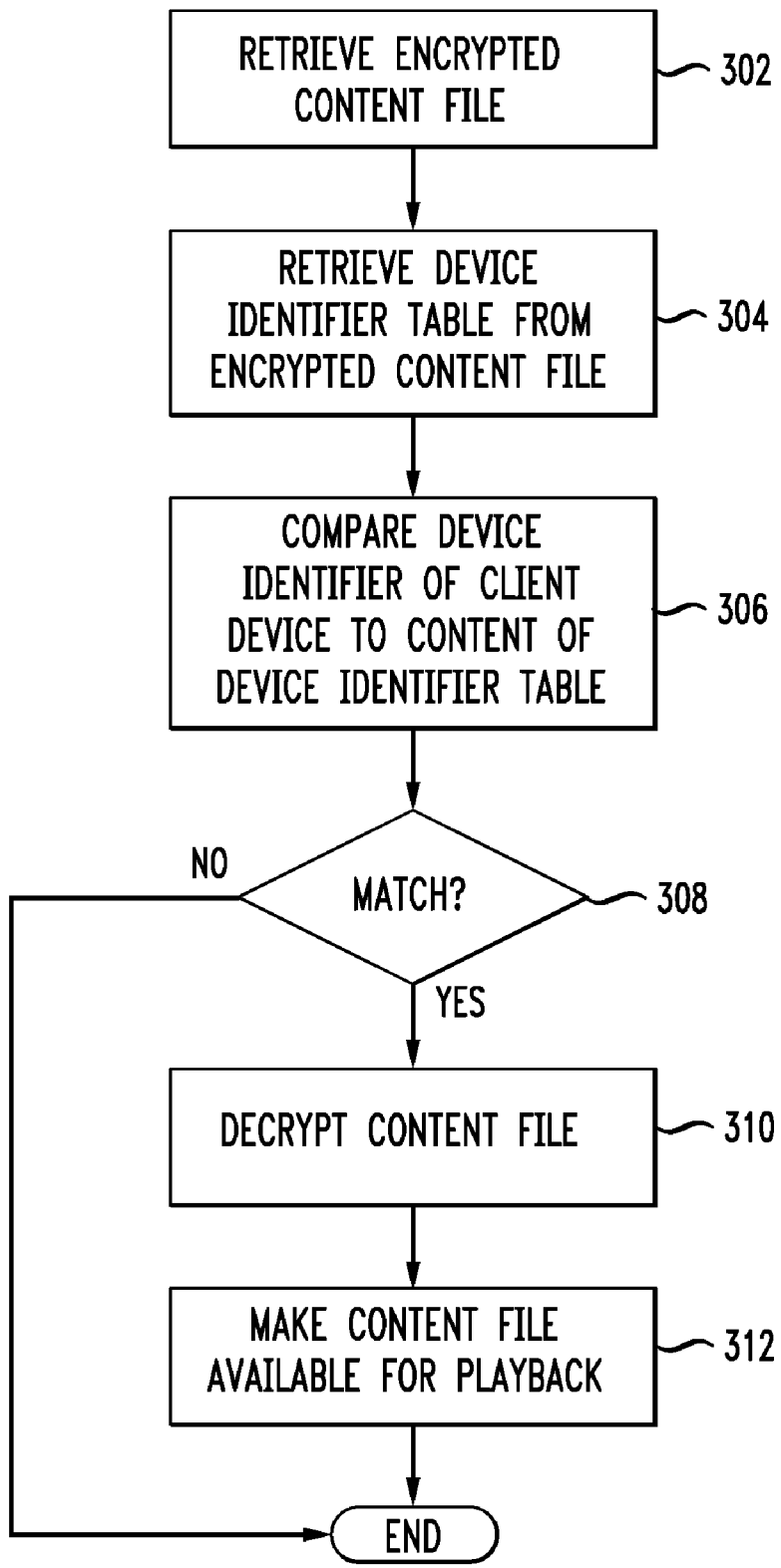
FIG. 3 is a flow chart of a process whereby a decision is made to grant or deny access by a client to encrypted desired content on the basis of a unique identifier of a device owned by the client.

FIG. 3 is a flowchart illustrating the process where the encrypted content received from the content provider 110 is accessed by the client 120. This process begins at step 302 where the encrypted content file is retrieved. At step 304, the device identifier table is extracted from the encrypted content file. In one embodiment, only the device identifier portion of the encrypted content file is decrypted initially. Next, at step 306, the unique client identifier of the client device on which the content is to be played is compared to the list of unique client identifiers included in the extracted device identifier table. In one embodiment, the same function used to retrieve the unique device identifiers at step 204 of FIG. 2 is used to retrieve the unique device identifier of the current device.

At step 308, a determination is made as to whether the device identifier of the client device on which the content is to be played is included amongst the set of one or more device identifiers included in the device identifier table. If the client device identifier is not included in the device identifier table, a match does not result and playback of the protected content is denied, ending the process. If the client device identifier is included in the device identifier table, the client device represents an authorized device and a match results. The process would then continue at step 310 where the downloaded encrypted content is decrypted. Finally, at step 312, the content is made available for playback.

The benefit of the present method of authorizing access to multiple client devices is readily apparent. By retrieving identifiers from a plurality of client devices, storing them in memory at the content provider server, and then binding the complete device identifier table to the desired content, a mechanism is provided for granting access to any of a plurality of legitimate devices the client may wish to use for playback.

Figure 4:
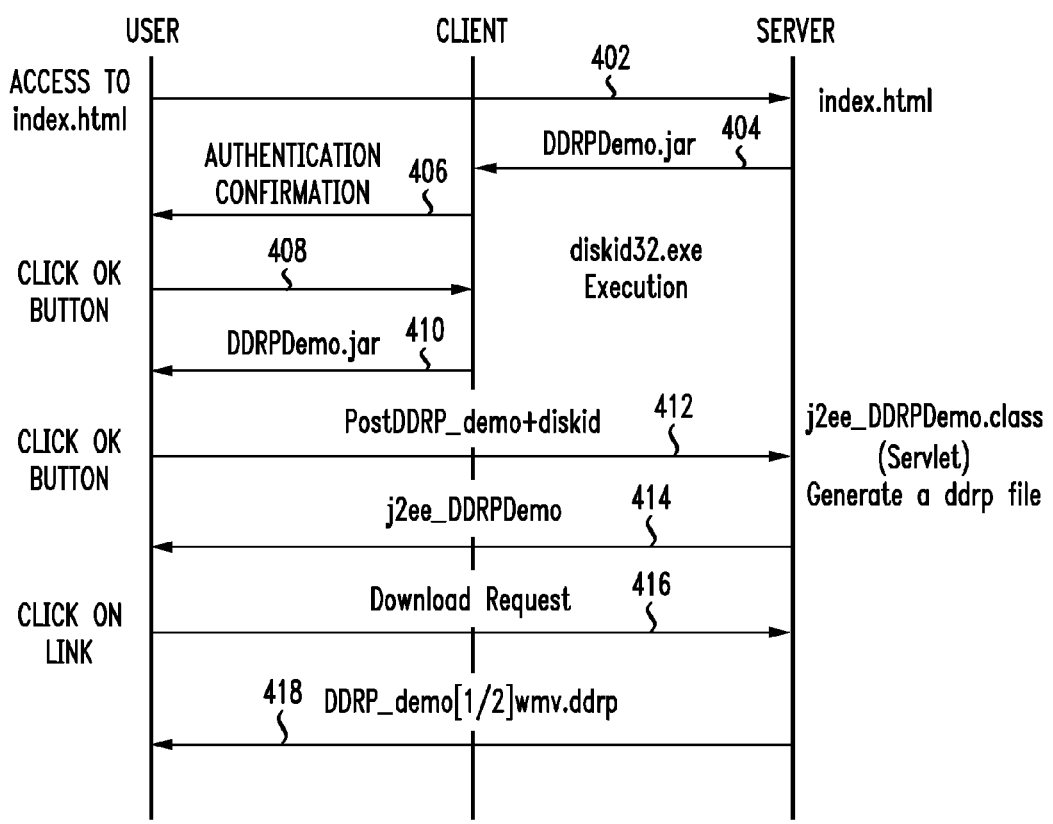
FIG. 4 is a data flow of an example implementation of a process whereby unique client device identifiers are retrieved and used to create a device identifier table at the content provider server.

Having described a general framework for controlling access to digital content, a description of a detailed embodiment of protected content distribution is now described with reference to FIG. 4. FIG. 4 illustrates a more detailed data flow for an embodiment of the process events illustrated generally in FIG. 2, notably where a client 120 seeks and acquires encrypted content from a content provider 110. It should be noted that the detailed data flow of FIG. 4 is directed to a particular PC computing environment. This description is not meant to be limiting as the concepts of the present invention can be applied to other computing environments as would be apparent.

In the data flow illustrated in FIG. 4, the process begins at step 402 with a user initiating contact with a content provider server. In one embodiment, this contact is enabled through standard web browser functionality that enables a user to navigate to a particular web page on a content provider web site. Once the user has navigated to the content provider web page, the content provider server would download, at step 404, a JAVA applet (DDRPDemo.jar) to the client machine, which would execute the applet within the browser of the client machine. Upon execution of the applet within the browser of the client machine, an authentication confirmation user interface element (e.g., an OK button) would be enabled within the browser window at step 406. A user would then choose a content file from a selection menu, and request the content file by providing the authentication confirmation (e.g., clicking the OK button) at step 408.

One of the functions of the applet is to download a file resident on the client provider server and to place that downloaded file in an arbitrary directory in the client machine. This file will be decoded and decompressed to produce the file diskid32.exe for execution by the client machine. This program, when executed, is designed to retrieve the device identifier for one or more client devices and is deleted as soon as the device identifier retrieval process finishes.

Prior to retrieving the device identifier(s), the applet would also request an approval from the user at step 410. Once the user provides the requested approval (e.g., clicking an OK button), the diskid32.exe program would proceed to retrieve the device identifier(s).

In general, PC, STB and other audio/video devices (e.g., mobile phone with audio or video playback capability, electronic book, or the like) on which digital formatted files can be played are equipped with storage devices such as a hard disk drive and a removable disk (e.g., CD and DVD). Typically, each storage device has its own reference number (e.g., the combination of vendor, product number, serial number, product revision number and other information from the device's read only memory (ROM)) that is allotted by the hardware vendor.

The diskid32.exe program is designed to retrieve the components of a defined reference number. In one embodiment, the diskid32.exe program represents an altered version of the freeware program DiskId32 written in C++, which operates on all Windows platforms with the following functions:
 ReadPhysicalDriveInNTWithAdminRights( );
 ReadIdeDriveAsScsiDriveInNT( );
 ReadPhysicalDriveInNTWithZeroRights( );
 ReadDrivePortsInWin9X( );

Once the device identifier(s) are retrieved, the device identifier(s) along with the identification of the content to be retrieved are then transmitted to the content provider server at step 412. In one embodiment, the JSObject class is used in the applet so that communication between applet and JavaScript can be performed by posting through the html form. As a result, the device identifier(s) acquired by diskid32.exe can be sent to the content provider server through JavaScript.

Since the unique device identifier(s) will be exchanged over network 130 (e.g., the Internet), an encoding/encryption technique is implemented because of security. Consequently, some code for encoding/encryption is incorporated in an encryption module that is accessible to the diskid32.exe program.

In one embodiment, encoding/encryption for content such as a multi-media file is carried out by a command line program by use of a COM component encryption software package such as axsStrongBox by Morello Publishing Ltd. In this embodiment, the following settings can be used for encryption: GZIP Compression, Rijndael Algorithm (private key -256 bit), Base64 Encoding, CBC mode, and PKCS7 Padding. Since these settings are set up as parameters, these settings can be changed flexibly. As for the key, an arbitrary 32 byte seed can be hardcoded within the program that is used to access the protected file.

After the client device identifiers and content identification are received at the content provider server, the content provider server can then proceed to generate the protected content file. In one embodiment, the set of device identifiers is placed in a device identifier table and encrypted. This encrypted device identifier table can then be merged with the encrypted content (optionally pre-encrypted) requested by the client to produce a protected content file.

In one embodiment, this function is accomplished by a JAVA servlet (j2ee_DDRPDemo.class), which is executed at the content provider server. This file protection process creates a protected content file by binding the desired content requested by the client to unique identifiers of a plurality of client devices to be utilized for playback. As would be appreciated, the specific method by which the device identifiers are bound to the content is implementation dependent.

At step 414, the servlet displays at the client browser a confirmation element (e.g., OK button) that allows the user to initiate the download of the requested content. After the download is requested by the user affirmation (e.g., clicking the OK button) at step 416, the protected content file (.ddrp file) is downloaded at step 418 to the client device where it will be tested to grant or deny access to the content.

Here, it should be noted that the corresponding decryption module accessed by the client device can be embodied as a Windows command line program which reproduces a file playable on the appropriate application from a file that has been downloaded from the content provider server. As noted in FIG. 3, if the actual device identifier of the machine and the device identifier bound to the content file matches, the content will be restored with decoding/decryption performed. It should be noted that although some content is output to a file when actually using it within an application, the content should be processed in memory and fed directly to the reproducing software. This process ensures that the unencrypted content is never left as a reproducible file on disk.

In an alternative embodiment, the protected content file can also be stored in some media (e.g., CD, DVD, or the like) at the server site and delivered to the user as a physical package.

Although the above description may contain specific details, they should not be construed as limiting the claims in any way. Other configurations of the described embodiments of the invention are part of the scope of this invention. Accordingly, the appended claims and their legal equivalents only should define the invention, rather than any specific examples given.

What is claimed is:

1. A content protection method that enables access to content by a plurality of client devices, the method comprising:
   receiving a plurality of unique identifiers that correspond to a plurality of client devices;
   binding, using an encryption key, a device identifier table with content to create a protected content file, said device identifier table including said plurality of unique identifiers that correspond to said plurality of client devices; and
   transmitting said protected content file to said user, wherein access to said content in said protected content file is based on a determination of whether an identifier associated with a client device used in an access transaction is included among said plurality of unique identifiers in said device identifier table of said protected content file.

2. The method as recited in claim 1, wherein said plurality of client devices include two or more of a storage device, a personal computer, a set top box, and an audio/video device.

3. The method as recited in claim 1, wherein said identifier associated with said client device used in said access transaction is a product ID number.

4. The method as recited in claim 1, wherein said identifier associated with said client device used in said access transaction is a serial number.

5. The method as recited in claim 1, wherein said identifier associated with said client device used in said access transaction is a product revision number.

6. The method as recited in claim 1, wherein said identifier associated with said client device used in said access transaction is a combination of two or more of a serial number, product revision number, or product ID number.

7. The method as recited in claim 1, wherein said binding comprises encrypting the protected content file.

8. A method for protecting content from unauthorized access, which method comprises:
   receiving a plurality of unique identifiers that correspond to a plurality of client devices;
   binding, using an encryption key, a device identifier table that includes said plurality of unique identifiers of said plurality of client devices with content to create a protected content file; and
   sending a portable media that contains said protected content file to a user, wherein access to said protected content file on said portable media is based on a determination of whether an identifier associated with a client device used for said access is included in said device identifier table of said protected content file.

9. The method as recited in claim 8, wherein said plurality of client devices include two or more of a storage device, a personal computer, a set top box, and an audio/video device.

10. The method as recited in claim 8, wherein said identifier associated with said client device used for said access is a product ID number.

11. The method as recited in claim 8, wherein said identifier associated with said client device used for said access is a serial number.

12. The method as recited in claim 8, wherein said identifier associated with said client device used for said access is a product revision number.

13. The method as recited in claim 8, wherein said identifier associated with said client device used for said access is a combination of two or more of a serial number, product revision number, or product ID number.

14. The method as recited in claim 8, wherein said binding comprises encrypting the protected content file.

15. A content protection method in a client device, the method comprising:
   receiving a protected content file in a client device, said received protected content file having a device identifier table that is bound to content using an encryption key, said device identifier table including a plurality of unique identifiers that correspond to a plurality of client devices that have been identified by a user, said plurality of unique identifiers being previously transmitted to a server; and
   accessing, via said client device, said content in said protected content, said accessing being dependent on a determination at said client device that an identifier associated with said client device is included among said plurality of unique identifiers in said device identifier table of said protected content file.

16. The method as recited in claim 15, wherein said plurality of client devices include two or more of a storage device, a personal computer, a set top box, and an audio/video device.

17. The method as recited in claim 15, wherein said identifier of said client device is a product ID number.

18. The method as recited in claim 15, wherein said identifier of said client device is a serial number.

19. The method as recited in claim 15, wherein said identifier of said client device is a product revision number.

20. The method as recited in claim 15, wherein said identifier of said client device is a combination of two or more of a serial number, product revision number, or product ID number.

* * * * *